(12) United States Patent
Xu et al.

(10) Patent No.: US 10,074,004 B2
(45) Date of Patent: Sep. 11, 2018

(54) CAPACITIVE FINGERPRINT SENSOR WITH INTEGRATOR

(71) Applicant: MICROARRAY MICROELECTRONICS CORP., LTD., Suzhou, Jiangsu Province (CN)

(72) Inventors: Kefeng Xu, Suzhou (CN); Yangyuan Li, Suzhou (CN)

(73) Assignee: MICROARRAY MICROELECTRONICS CORP., LTD., Suzhou, Jiangsu Province (CN)

(*) Notice: Subject to any disclaimer, the term of this patent is extended or adjusted under 35 U.S.C. 154(b) by 48 days.

(21) Appl. No.: 15/230,368

(22) Filed: Aug. 5, 2016

(65) Prior Publication Data

US 2017/0235993 A1    Aug. 17, 2017

(30) Foreign Application Priority Data

Jun. 8, 2015    (CN) .......................... 2015 1 0309222

(51) Int. Cl.
*G06K 9/00*     (2006.01)
*G06F 3/041*    (2006.01)
*G06F 3/044*    (2006.01)

(52) U.S. Cl.
CPC ........... *G06K 9/0002* (2013.01); *G06F 3/044* (2013.01); *G06F 3/0416* (2013.01)

(58) Field of Classification Search
None
See application file for complete search history.

(56) References Cited

U.S. PATENT DOCUMENTS

| | | | | |
|---|---|---|---|---|
| 9,958,986 | B2* | 5/2018 | Ahn | G06F 3/044 |
| 2011/0261006 | A1* | 10/2011 | Joharapurkar | G06F 3/0416 |
| | | | | 345/174 |
| 2014/0132562 | A1* | 5/2014 | Miyamoto | G06F 3/0418 |
| | | | | 345/174 |

FOREIGN PATENT DOCUMENTS

| | | |
|---|---|---|
| CN | 102954753 A | 3/2013 |
| CN | 103714330 A | 4/2014 |

* cited by examiner

*Primary Examiner* — Duane N Taylor, Jr.
(74) *Attorney, Agent, or Firm* — Cheng-Ju Chiang

(57) ABSTRACT

The present invention provides a "C-Q-T" type capacitive fingerprint sensor with an integrator. The integrator comprises an amplifier, an integrating capacitor, a reference voltage and a reset circuit. By applying the present invention, linearity and sensitivity of the "C-Q-T" type capacitive fingerprint sensor are improved. During a conversion process of the "C-Q-T", through introduction of the integrator, charge transfer quantities between a target capacitor and the integrating capacitor can be consistent for each time, so that a sensing equation is optimized, and better linearity is shown in the conversion process. As influence of a background capacitor and of a bus parasitic capacitor on the sensing equation is removed, the sensitivity of the "C-Q-T" type capacitive fingerprint sensor is improved.

12 Claims, 7 Drawing Sheets

_US 10,074,004 B2_

CAPACITIVE FINGERPRINT SENSOR WITH INTEGRATOR

TECHNICAL FIELD

The present invention relates to a capacitive fingerprint sensor, and particularly to a "C-Q-T" type capacitive fingerprint sensor with an integrator.

BACKGROUND ART

"C-V-T" type capacitive distance sensors are disclosed for the first time in a Chinese invention patent with the title of "Capacitive Distance Sensor" and the application number of 201210403271.2. In the "C-V-T" type capacitive distance sensors, measuring circuits are simplified and under the same process conditions, the technical level of such sensors is higher than the internationally advanced level in 2012. As the technology of Touch ID sensors installed in iPhone5S is proposed by Apple Inc. in 2013, the development and application of fingerprint sensor technologies are greatly pushed forward, and the consumer electronics market has huge demand and higher requirements for the fingerprint sensor technologies.

Technical schemes of the capacitive fingerprint sensors disclosed in a Chinese invention patent with the title of "Capacitive Fingerprint Sensor" and the application number of 201410004072.3 lie in that a sensing equation and a circuit model are optimized on the basis of the Chinese invention patent with the title of "Capacitive Distance Sensor" and the application number of 201210403271.2, and "C-Q-T" conversion is realized in the proposed circuit structures. However, there are several problems described below.

First, it can be observed from the sensing equation $Vt'=(Vs-Vt)*(Cd+Cg)/(Ct+Cd+Cg)$ that variation $Vt'$ of voltage $Vt$ of an integrating capacitor during each iteration is negatively correlated with $Vt$. On one hand, $Vt'$ causes gradual decrease of $Vt$, which further leads gradual decrease of $Vt'$, while smaller $Vt'$ is likely to be interfered by noise. Thus, a comparator flip will become either earlier or later, resulting in noise interference with output of the sensor. On the other hand, a relation between output time of the sensor and target capacitors $Cg$ is convex nonlinear. The convex nonlinear relation may serve as a compensation measure for convex nonlinear conversion from distances to capacitance within a certain spatial scale, which has been explained in the above two Chinese invention patents with the titles of "Capacitive Distance Sensor" and "Capacitive Fingerprint Sensor". With the development of technologies, the thickness of a dielectric layer between a sensing electrode and a target electrode in a commercial capacitive fingerprint sensor is increased from an order of magnitude of 10 um to an order of magnitude of 100 um, so that the distance-to-capacitance conversion relationship falls into an approximately linear region. Thus the convex nonlinear conversion from output of the target electrode to output of the fingerprint sensor has become a disadvantage.

Meanwhile, in a technical scheme of the Chinese invention patent with the application number of 201410004072.3, a bus parasitic capacitor is calculated into the integrating capacitor, improving the discreteness of the integrating capacitor. As a background capacitor in a sensing unit is not removed from the sensing equation, manufacturing tolerance of the background capacitor will cause inconsistence among units in a fingerprint sensor array.

SUMMARY

One objective of the present invention is to provide a capacitive fingerprint sensor better in linearity and anti-noise capability.

To realize the above objective, the present invention adopts the following technical schemes.

A capacitive fingerprint sensor with an integrator comprises a sensing array, the integrator, a bus and a comparison circuit.

The sensing array comprises a plurality of sensing units, wherein each sensing unit comprises a target electrode, a sensing electrode, a driving electrode, a first level driver, a second level driver, a line selection switch, an initialization switch and a first reference voltage, and an output terminal of each sensing unit is connected to the bus.

An input terminal of the integrator is connected to the bus, and an output terminal of the integrator is connected to an input terminal of the comparison circuit.

The input terminal of the comparison circuit is connected to an output terminal of the integrator, and the output terminal of the integrator is that of the capacitive fingerprint sensor.

In each sensing unit, the sensing electrode comprises one or more electrodes, is connected to a first port of the initialization switch, and is connected to a first port of the line selection switch; the target electrode is a surface of a target to be measured, is connected to the first level driver and is positioned above the sensing electrode, wherein a dielectric layer is formed between the target electrode and the sensing electrode, and a target capacitor is formed between the target electrode and the sensing electrode.

The driving electrode comprises one or more driving electrodes, is connected to the second level driver and is positioned below the sensing electrode, wherein another dielectric layer is formed between the driving electrode and the sensing electrode, and a driving capacitor is formed between the driving electrode and the sensing electrode.

A control terminal of the first level driver is connected to a first level control signal, and an output terminal of the first level driver is connected to the target electrode.

A control terminal of the second level driver is connected to a second level control signal, and an output terminal of the second level driver is connected to the driving electrode.

A first port of the line selection switch is connected to the sensing electrode, and a second port of the line selection switch is connected to the output terminal of the sensing unit.

A first port of the initialization switch is connected to the sensing electrode, and a second port of the initialization switch is connected to the first reference voltage.

The first reference voltage is connected to the second port of the initialization switch.

The first level driver outputs a level V11 to the target electrode via a resistor when the first level control signal is low, and outputs a level V12 to the target electrode via the resistor when the first level control signal is high.

In a further improved technical scheme of the present invention, the first level driver outputs a level V11 to a capacitor when the first level control signal is low, and outputs a level V12 to the capacitor when the first level control signal is high, wherein the capacitor outputs an alternating current (AC) component of the levels V11 and V12 in a coupled manner to the target electrode.

In a further improved technical scheme of the present invention, the first level driver outputs a level V11 to a converting circuit when the first level control signal is low, and outputs a level V12 to the converting circuit when the first level control signal is high, wherein the AC component of the levels V11 and V12 is converted to a reverse AC level through the converting circuit to be coupled to a ground level of the capacitive fingerprint sensor.

The second level driver outputs a level V21 to the driving electrode when the second level control signal is low, and outputs a level V22 to the driving electrode when the second level control signal is high.

The integrator comprises an amplifier, an integrating capacitor, a second reference voltage, a second reset switch, a third reset switch, a following switch and a fourth reference voltage.

A first input terminal of the amplifier is connected to the input terminal of the integrator, a second input terminal of the amplifier is connected to the second reference voltage, and an output terminal of the amplifier is connected to that of the integrator.

A first port of the integrating capacitor is connected to the first input terminal of the amplifier, and a second port of the integrating capacitor is connected to a first port of the third reset switch.

The second reference voltage is connected to the second input terminal of the amplifier.

A first port of the second reset switch is connected to the second reference voltage, and a second port of the second reset switch is connected to the first input terminal of the amplifier.

A first port of the third reset switch is connected to the second port of the integrating capacitor, and a second port of the third reset switch is connected to the fourth reference voltage.

A first port of the following switch is connected to the second port of the integrating capacitor, and a second port of the following switch is connected to the output terminal of the integrator.

The fourth reference voltage is connected to the second port of the third reset switch.

A reset time sequence of the integrator is as below: step 1-1: turning off the following switch; step 1-2: turning on the second reset switch, and turning on the third reset switch; step 1-3: turning off the second reset switch, and turning off the third reset switch; and step 1-4: turning on the following switch.

The present invention may use a design of a simplified integrator, in which an amplifier is connected to be used as a unity-gain buffer to reset the integrator. The simplified integrator comprises the amplifier, an integrating capacitor, a second reference voltage and a first reset switch.

A first input terminal of the amplifier is connected to the input terminal of the integrator, a second input terminal of the amplifier is connected to the second reference voltage, and an output terminal of the amplifier is connected to that of the integrator.

The integrating capacitor comprises one or more capacitors, a first port of the integrating capacitor is connected to the first input terminal of the amplifier, and a second port of the integrating capacitor is connected to the output terminal of the amplifier.

The second reference voltage is connected to the second input terminal of the amplifier.

A first port of the first reset switch is connected to the first input terminal of the amplifier, and a second port of the first reset switch is connected to the output terminal of the amplifier.

A reset time sequence of the integrator is as below: step 2-1: turning on the first reset switch; and step 2-2: turning off the first reset switch.

The comparison circuit comprises a comparator and a third reference voltage.

A first input terminal of the comparator is connected to an input terminal of the comparison circuit, a second input terminal of the comparator is connected to the third reference voltage, and an output terminal of the comparator is connected to that of the comparison circuit.

The third reference voltage is connected to the second input terminal of the comparator.

Principles, time sequence control and a sensing equation related in the present invention are as follows.

The specific implementation of the "C-Q-T" type fingerprint sensor provided by the present invention is described hereinafter.

A coupling capacitor (equivalent to the target capacitor) is formed between the surface of a fingerprint to be measured (equivalent to the target electrode) and a capacitance measuring plate (equivalent to the sensing electrode); and distances from different regions on the surface of the fingerprint to be measured to different capacitance measuring plates in a corresponding sensor array are different, so do the target capacitors. The integrating capacitor is firstly charged to reach the fourth reference voltage, and then periodically discharges to the target capacitor. Based on the circuit and a control method designed in the present invention, a charge quantity of discharge to the target capacitor for each time is related to a capacity of the target capacitor; and for the same target capacitor, charge quantities of discharge for each time are the same. Therefore, gradual decrease rates of charge in the integrating capacitor are linearly related to the target capacitor. When a voltage of the integrating capacitor is changed from the fourth reference voltage to the third reference voltage, namely the reference voltage of the comparison circuit, the comparison circuit outputs signal flip; and the times for signal flip are reciprocal values of discharge rates of the integrating capacitor, and the time change is approximately linear in a certain numerical interval. A sensing process of the sensor depends on "the capacity of the target capacitor-differences in discharge rates of the integrating capacitor-the time sequence of flips in the comparison circuit", namely the "C-Q-T" process.

In order to analyze the circuit equation, the "C-Q-T" process is divided into a "C-Q" conversion process and a "Q-T" conversion process.

The "C-Q" conversion process comprises two parts, namely resetting of the integrator and the integrating capacitor repeatedly discharging to the target capacitor.

A reset process of the integrator is that the integrating capacitor is charged to reach the fourth reference voltage. Let a value of the second reference voltage be VREF2, a value of the fourth reference voltage be VREF4, and a value of the integrating capacitor be Cr, so the charge quantity in the integrating capacitor is Qr.rst=(VREF4-VREF2) *Cr.

If the integrator provided by the present invention adopts another simplified reset circuit, the simplified reset circuit lies in that for voltages of the integrator in the above example, VREF4 is equal to VREF2. When the integrator resets, the amplifier is connected to be used as a unity-gain buffer to enable the output terminal of the integrator to reset to VREF2, so that levels at the two terminals of the integrating capacitor are VREF2, and the charging quantity in the integrating capacitor is Qr.rst=0.

The process that the integrating capacitor repeatedly discharges to the target capacitor is as follow: step 3-1, turning off the line selection switch; step 3-2, turning on the initialization switch, and connecting the first reference voltage to the sensing electrode; step 3-3, setting the first level control signal to be high, and setting the second level control signal to be high; step 3-4, turning off the initialization switch; step 3-5, turning on the line selection switch; step 3-6, setting the first level control signal to be low and setting the second level control signal to be low; and step 3-7, returning to step 3-1.

Let a value of the target capacitor be Cf, a value of the driving capacitor be Cd, a value of the parasitic capacitor in each sensing unit be Cb, a value of the bus parasitic capacitor be Cp, a value of the first reference voltage be VREF1, and a value of the third reference voltage be VREF3. Meanwhile, it is defined that $\Delta V1=V12-V11$, $\Delta V2=V22-V21$ and $\Delta VREF=VREF2-VREF1$.

According to the charge balance principle and the integrator operating principle, the charge quantity $\Delta Q$ that the integrating capacitor discharges to the target capacitor for each time is as follows:

$$\Delta Q=(\Delta VREF-\Delta V1)*Cf+(\Delta VREF-\Delta V2)*Cd+\Delta VREF*Cb \quad (1)$$

The "Q-T" conversion process is described hereinafter.

In the "C-Q" conversion process, charge in the integrating capacitor will be repeatedly discharged to the target capacitor, so that output of the integrating capacitor will change unidirectionally. The output terminal of the integrator is connected to the comparison circuit. When the output of the integrator passes through the third reference voltage of the comparison circuit, the comparison circuit outputs o a flip, and the flip time is the output of the fingerprint sensor. If a value of the third reference voltage is VREF3, at the time the comparison circuit outputs the flip, the charge quantity of the integrating capacitor is Qr.end=(VREF3−VREF2)*Cr.

The time for the flip of the comparison circuit is:

$$T=(Qr.end-Qr.rst)/\Delta Q \quad (2)$$

For a design of the given fingerprint sensor, (Qr.end-Qr.rst) is a fixed value; and according to the equation (1), $\Delta Q$ is just a linear function of Cf. In practice, T is an integer, and the value of T represents the output of the "C-Q-T" type fingerprint sensor.

Combining the equations (1) and (2), compared with the prior art, the technical scheme provided by the present invention has the following advantages.

1) It can be known from the equations (1) and (2), there is no bus parasitic capacitor Cp related in the charge iterative equations provided by the present invention, which means that the present invention can completely eliminate the influence of the bus parasitic capacitor Cp. Therefore, a problem of deviation caused by inconsistent processes of the bus parasitic capacitor is effectively solved.

2) It can be known from the equation (1), $\Delta Q$ is just a linear function of Cf. When the fingerprint sensor measures a target capacitor Cf, $\Delta Q$ is a constant value, which means that charge quantities of discharge of the integrating capacitor for each time are the same, so that the change curve of the charge quantities in the integrating capacitor is linear.

3) Particularly, when $\Delta VREF=1$, the equation (1) is converted into:

$$\Delta Q=-\Delta V1*Cf-\Delta V2*Cd \quad (3)$$

From the equation (3), it is known that in such condition, the influence of the background capacitor Cb in each sensing unit may be completely removed.

4) Particularly, when $\Delta VREF=\Delta V2$, the equation (1) is converted into:

$$\Delta Q=(\Delta VREF-\Delta V1)*Cf+\Delta VREF*Cb \quad (4)$$

From the equation (4), it is known that in such condition, the influence of the driving capacitor Cd may be completely removed.

5) More particularly, when $\Delta VREF=\Delta V2=0$, the equation (1) is converted into:

$$\Delta Q=-\Delta V1*Cf \quad (5)$$

From the equation (5), it is known that in such condition, the influence of the background capacitor Cb in each sensing unit and the driving capacitor Cd may be completely removed.

Therefore, via analysis of the equations (3)-(5), a circuit structure provided by the present invention has a variety of operating modes; and the first reference voltage, the second reference voltage, the first level driver and the second level driver may be reasonably designed according to requirements on cost, power consumption and sensitivity etc.

DETAILED DESCRIPTION

Figure 1:
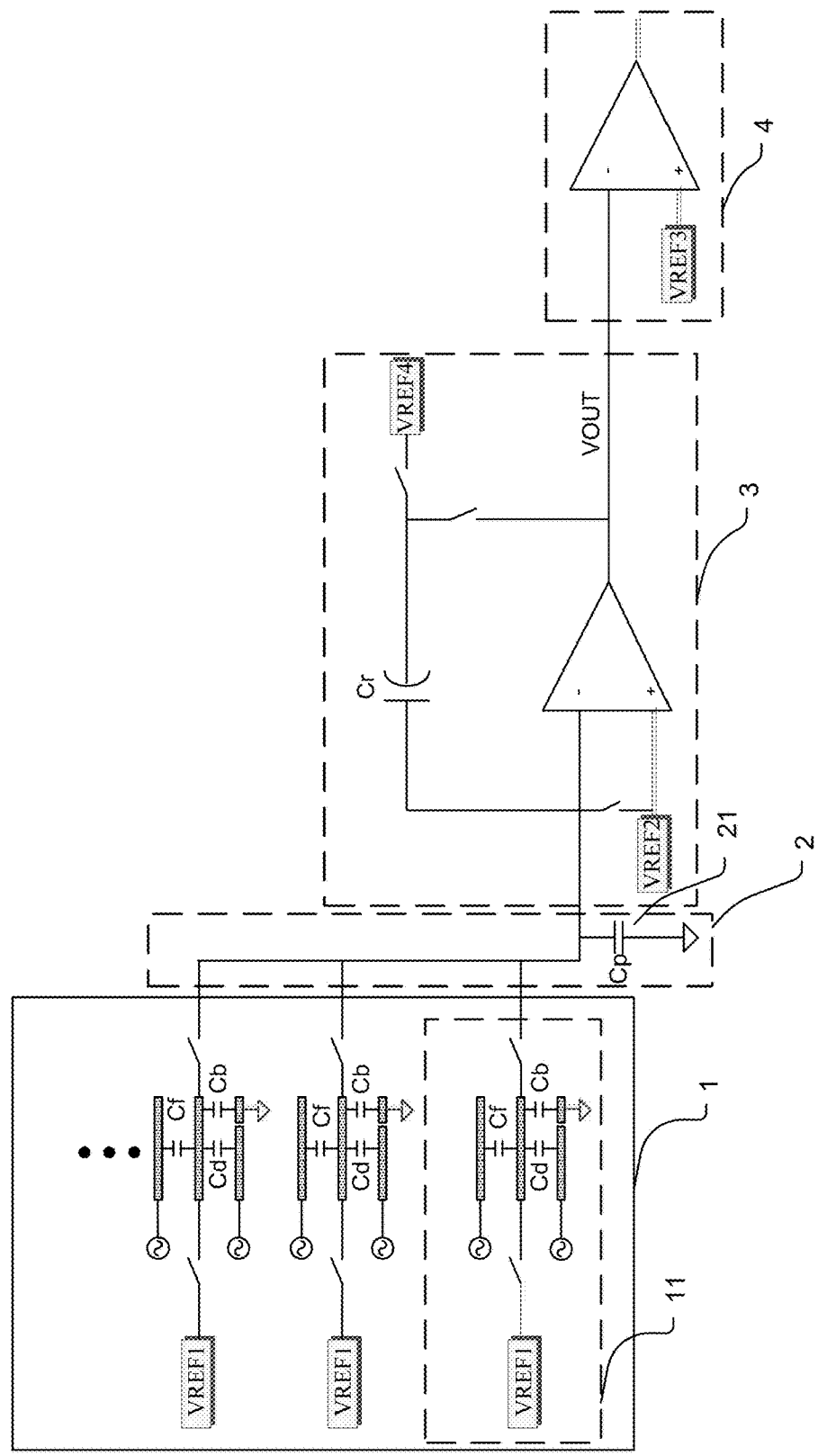
FIG. 1 is a circuit diagram of a capacitive fingerprint sensor provided by the present invention.

FIG. 1 is a circuit diagram of a capacitive fingerprint sensor provided by the present invention. As shown in FIG. 1, the capacitive fingerprint sensor provided by the present invention comprises a sensing array 1, a bus 2, an integrator 3, a comparator module 4 and a bus parasitic capacitor 21, wherein the sensing array 1 comprises a plurality of sensing unit 11.

Figure 2:
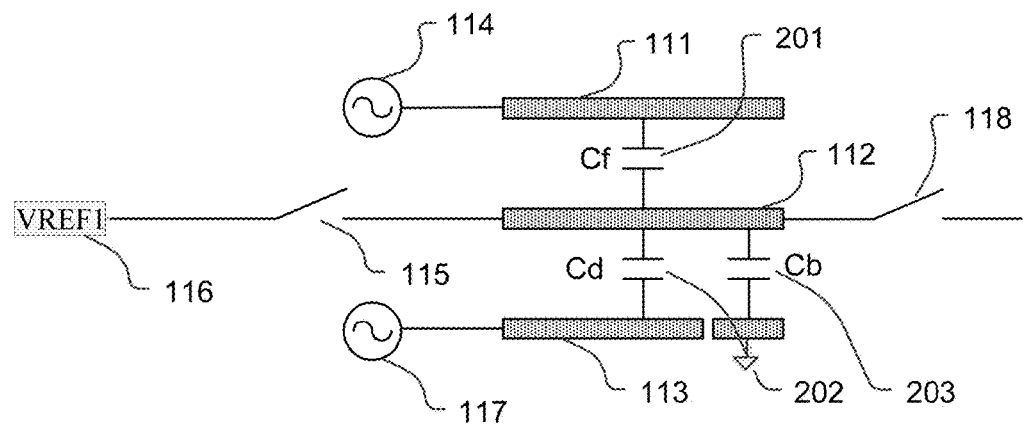
FIG. 2 is a circuit diagram of a sensing unit provided by the present invention.

FIG. 2 is a circuit diagram of a sensing unit provided by the present invention. As shown in FIG. 2, each sensing unit 11 comprises a target electrode 111, a sensing electrode 112, a driving electrode 113, a first level driver 114, a second level driver 117, a line selection switch 118, an initialization switch 115 and a first reference voltage 116.

The sensing electrode 112 comprises one or more sensing electrodes, and is connected to a first port of the initialization switch 115 and a first port of the line selection switch 118.

The target electrode 111 is a surface of a target to be measured, is connected to the first level driver 114 and is positioned above the sensing electrode 112, wherein a dielectric layer is formed between the target electrode 111 and the sensing electrode 112, and a target capacitor 201 is formed between the target electrode 111 and the sensing electrode 112.

The driving electrode 113 comprises one or more driving electrodes, is connected to the second level driver 117 and is positioned below the sensing electrode 112, wherein another dielectric layer is formed between the driving electrode 113 and the sensing electrode 112, and a driving capacitor 202 is formed between the driving electrode 113 and the sensing electrode 112.

The first level driver 114 is connected to the target electrode 111.

The second level driver 117 is connected to the driving electrode 113.

A first port of the initialization switch 115 is connected to the sensing electrode 112, and a second port of the initialization switch 115 is connected to the first reference voltage 116.

A first port of the line selection switch 118 is connected to the sensing electrode 112, and a second port of the line selection switch 118 is connected to the output terminal of the sensing unit 111.

The output terminal of the sensing unit 111 is connected to the bus 2.

Each sensing unit 111 further comprises a background capacitor 203 therein.

Figure 3:
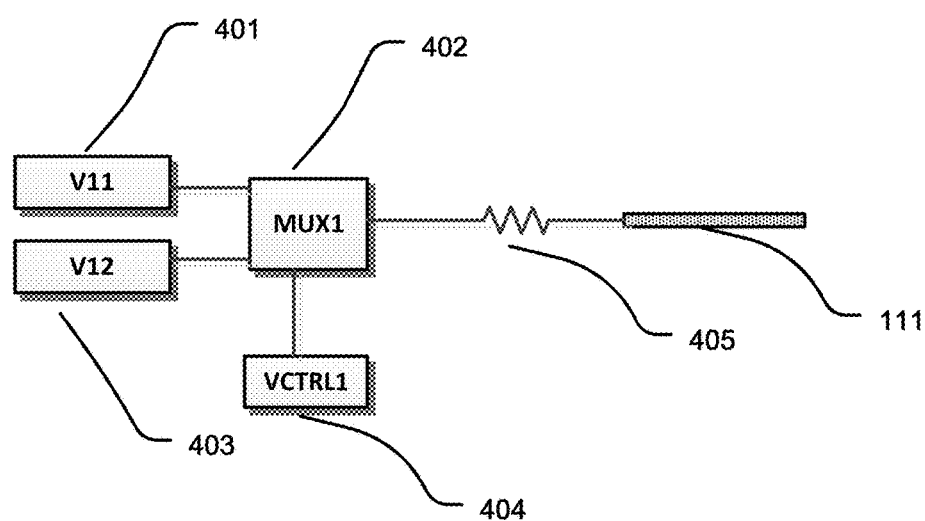
FIG. 3 shows a first level driver according to a first embodiment.

FIG. 3 shows a first level driver according to a first embodiment. As shown in FIG. 3, the first level driver comprises an input level V11 401, another input level V12 403, a first level control signal 404, a first level selector 402 and a resistor 405. The input level V11 401 is connected to a first input terminal of the first level selector 402; the input level V12 403 is connected to a second input terminal of the first level selector 402; the first level control signal 404 is connected to a control terminal of the first level selector 402; an output terminal of the first level selector 402 is connected to a first port of the resistor 405; and a second port of the resistor 405 is connected to the target electrode 111.

The first level selector 402 outputs a first input terminal level when the first level control signal 404 is low, and outputs a second input terminal level when the first level control signal 404 is high.

Figure 4:
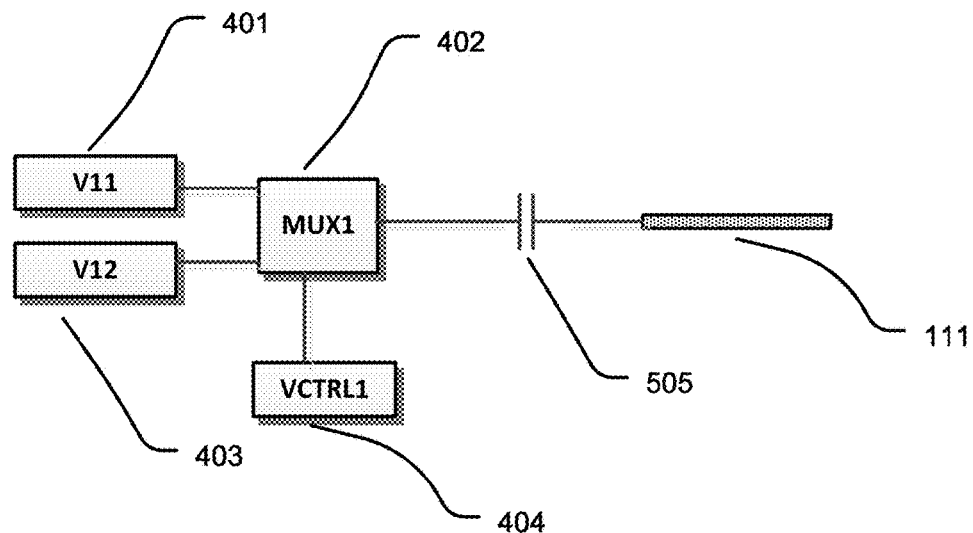
FIG. 4 shows another first level driver according to a second embodiment.

FIG. 4 shows another first level driver according to a second embodiment. As shown in FIG. 4, the first level driver comprises an input level V11 401, another input level V12 403, a first level control signal 404, a first level selector 402 and a capacitor 505. The input level V11 401 is connected to a first input terminal of the first level selector 402; the input level V12 403 is connected to a second input terminal of the first level selector 402; the first level control signal 404 is connected to a control terminal of the first level selector 402; an output terminal of the first level selector 402 is connected to a first port of the capacitor 505; and a second port of the capacitor 505 is connected to the target electrode 111.

The first level selector 402 outputs a first input terminal level when the first level control signal 404 is low, and outputs a second input terminal level when the first level control signal 404 is high.

Figure 5:
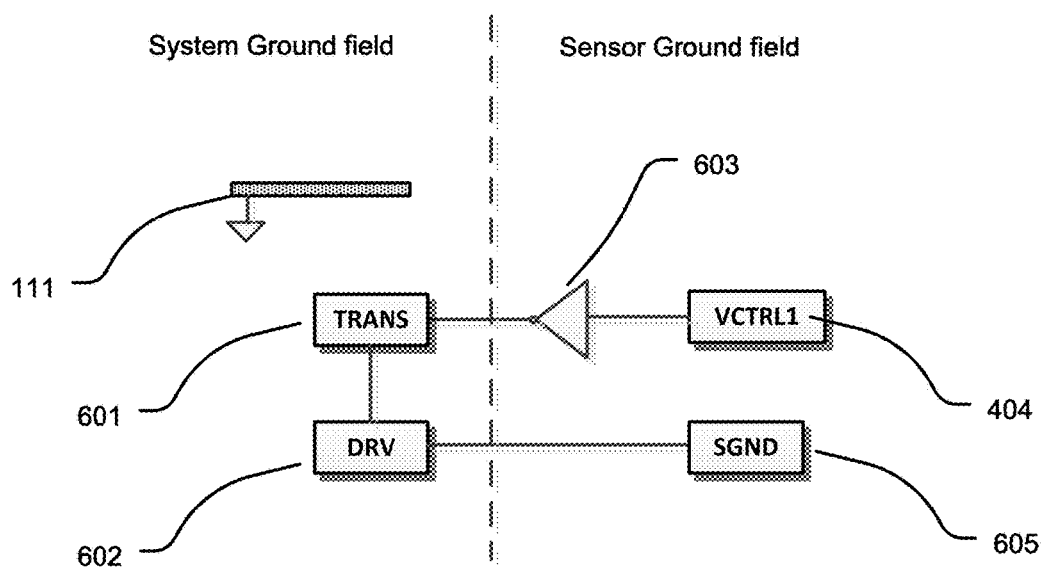
FIG. 5 shows yet another first level driver according to a third embodiment.

FIG. 5 shows yet another first level driver according to a third embodiment. As shown in FIG. 5, the first level driver comprises a phase inverter 603, a signal converter 601, a driving circuit 602, a first level control signal 404 and a sensor ground level input terminal 605. The first level control signal 404 is connected to an input terminal of the phase inverter 603; an output terminal of the phase inverter 603 is connected to an input terminal of the signal converter 601; an output terminal of the signal converter 601 is connected to a control terminal of the driving circuit 602; an output terminal of the driving circuit 602 is connected to the sensor ground level input terminal 605; and the target electrode 111 is grounded or suspended in the air.

The signal converter 601 is configured to convert an input signal from a sensor ground level domain to a system ground level domain.

The driving circuit 602 is configured to amplify an input terminal level and provide driving at the output terminal.

Figure 6:
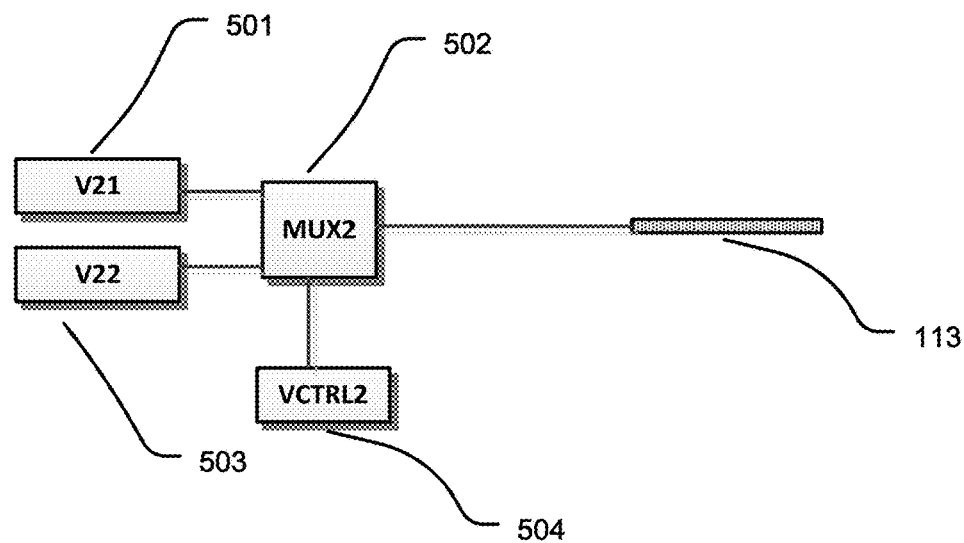
FIG. 6 shows a schematic drawing of a second level driver.

FIG. 6 shows a schematic drawing of a second level driver. As shown in FIG. 6, the second level driver comprises an input level V21 501, another input level V22 503, a second level control signal 504 and a second level selector 502. The input level V21 501 is connected to a first input terminal of the second level selector 502; the input level V22 503 is connected to a second input terminal of the second level selector 502; the second level control signal 504 is connected to a control terminal of the second level selector 502; and an output terminal of the second level selector 502 is connected to the driving electrode 113.

The second level selector 502 outputs a first input terminal level when the second level control signal 504 is low, and outputs a second input terminal level when the second level control signal 504 is high.

Figure 7:
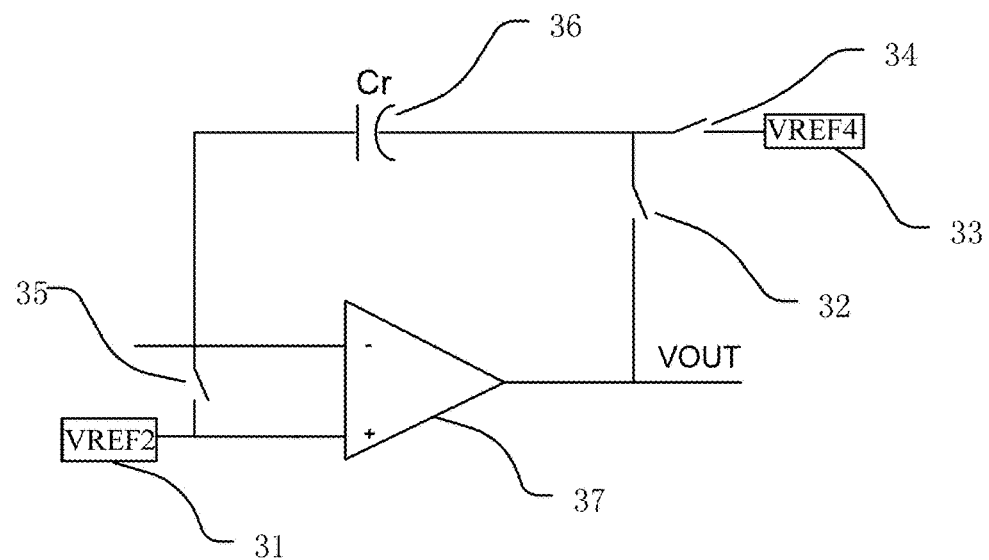
FIG. 7 shows an integrator provided by the present invention according to a first embodiment.

FIG. 7 shows an integrator provided by the present invention according to a first embodiment. As shown in FIG. 7, the integrator 3 comprises an amplifier 37, an integrating capacitor 36, a second reference voltage 31, a second reset switch 34, a third reset switch 35, a following switch 32 and a fourth reference voltage 33.

A first port of the third reset switch 35 is connected to the second reference voltage 31, and a second port of the third reset switch 35 is connected to a first input terminal of the amplifier 37.

A first port of the second reset switch 34 is connected to a first port of the integrating capacitor 36, and a second port of the second reset switch 34 is connected to the fourth reference voltage 33.

A first port of the integrating capacitor 36 is connected to the first input terminal of the amplifier 37, and a second port of the integrating capacitor 36 is connected to the first port of the second reset switch 34.

A first port of the following switch 32 is connected to the second port of the integrating capacitor 36, and a second port of the following switch 32 is connected to the output terminal of the integrator 3.

A first input terminal of the amplifier 37 is connected to the input terminal of the integrator 3, a second input terminal of the amplifier 37 is connected to the second reference voltage 31, and an output terminal of the amplifier is connected to the output terminal of the integrator 3.

The input terminal of the integrator 3 is connected to the bus 2, and the output terminal of the integrator 3 is connected to an input terminal of the comparison circuit 4.

Figure 8:
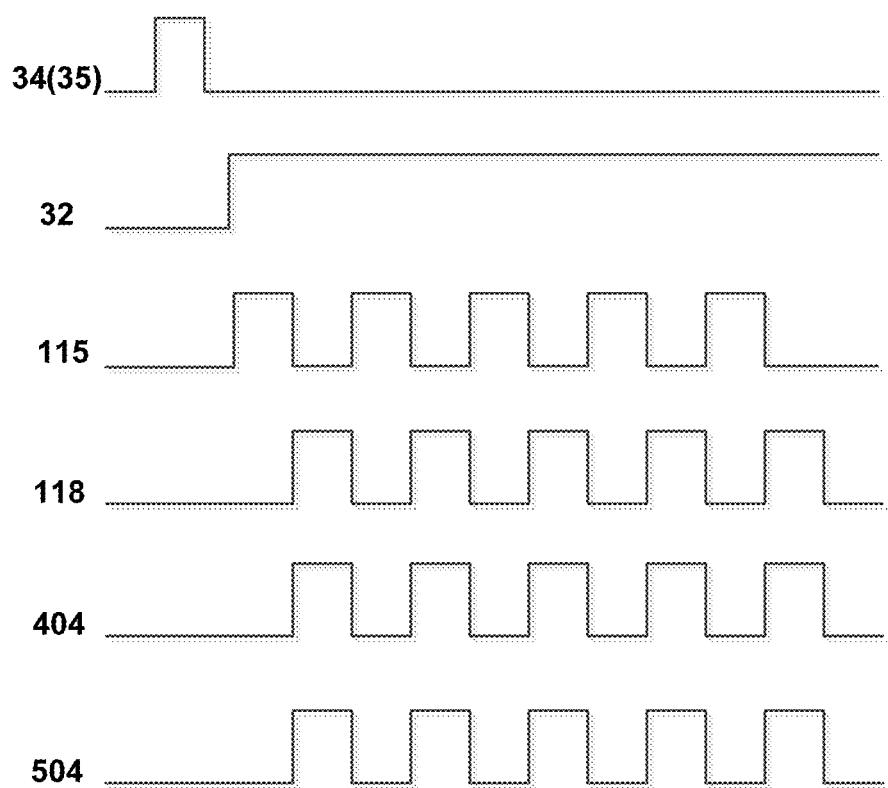
FIG. 8 shows a main time sequence control and driving waveform of the integrator of the present invention shown in FIG. 7.

FIG. 8 shows a main time sequence control and driving waveform of the integrator of the present invention shown in FIG. 7. As shown in FIG. 8, the main time sequence control process comprises: step 1: turning off all switches in the circuit; step 2: turning on the second reset switch 34 or the third reset switch 35; step 3: turning off the second reset switch 34 or the third reset switch 35; step 4: turning on the following switch 32; step 5: turning off the line selection switch 118; step 6: turning on the initialization switch 115, and connecting the first reference voltage 116 to the sensing electrode 112; step 7: setting the first level control signal 404 to be high and setting the second level control signal 504 to be high; step 8: turning off the initialization switch 115; step 9: turning on the line selection switch 118; step 10: setting the first level control signal 404 to be low and setting the second level control signal 504 to be low; and step 11: returning to step 5.

Figure 9:
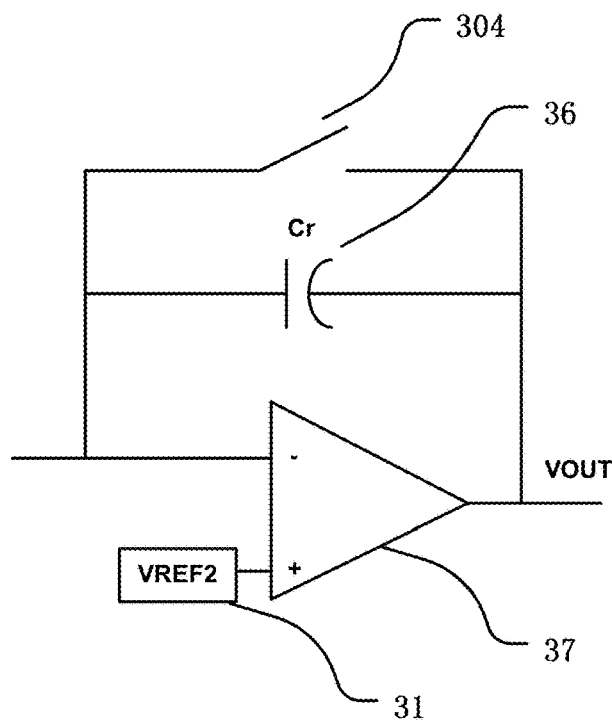
FIG. 9 shows another integrator provided by the present invention according to a second embodiment.

FIG. 9 shows a circuit diagram of an integrator provided by the present invention according to a second embodiment. As shown in FIG. 9, the integrator 3 comprises an amplifier 37, a second reference voltage 31, an integrating capacitor 36 and a first reset switch 304.

A first input terminal of the amplifier 37 is connected to the input terminal of the integrator 3, a second input terminal of the amplifier 37 is connected to the second reference voltage 31, and an output terminal of the amplifier is connected to the output terminal of the integrator 3.

A first port of the integrating capacitor 36 is connected to the first input terminal of the amplifier 37, and a second port of the integrating capacitor 36 is connected to the output terminal of the amplifier 37.

A first port of the first reset switch 304 is connected to the first input terminal of the amplifier 37, and a second port of the first reset switch is 304 is connected to the output terminal of the amplifier 37.

In this embodiment shown in FIG. 9, the first reset switch 304 of the integrator 3 will reset the output of the integrator 3 to the second reference voltage 31. In other words FIG. 9 shows a simplified structure of the integrator 3 shown in FIG. 7.

Figure 10:
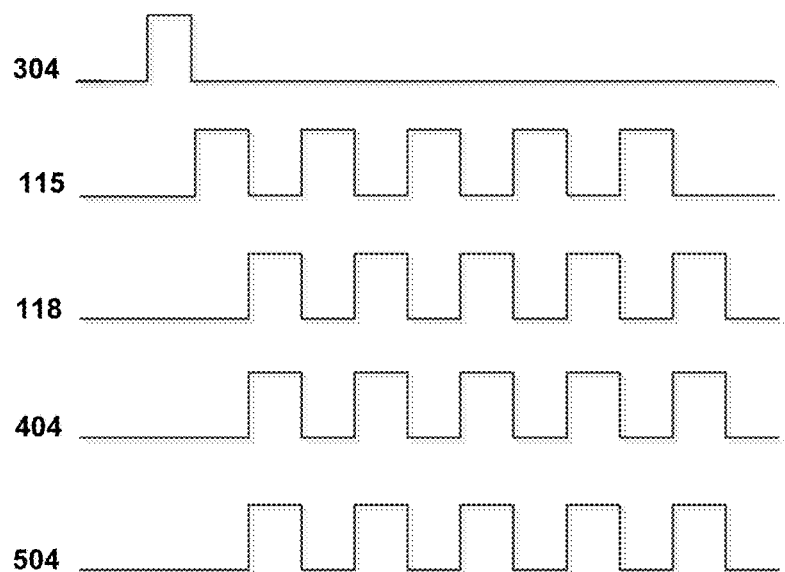
FIG. 10 shows a main time sequence control and driving waveform of the integrator of the present invention shown in FIG. 9.

FIG. 10 shows a main time sequence control and driving waveform of the integrator 3 of the present invention shown in FIG. 9. Referring to FIG. 10, an operation time sequence of the integrator 3 shown in FIG. 9 is changed only during resetting, while operation time sequences of other parts are the same. In resetting the integrator 3, first, the first reset switch 304 is turned on, the amplifier 37 is connected to be used as the unity-gain buffer, the output terminal of the amplifier 37 is reset to a level of the second reference voltage 31, and then the first reset switch 304 is turned off, but the output terminal of the amplifier 37 is kept at the level of the second reference voltage 31 through the integrating capacitor 36, so that the output terminal of the integrator 3 is reset to the level of the second reference voltage 31.

Figure 11:
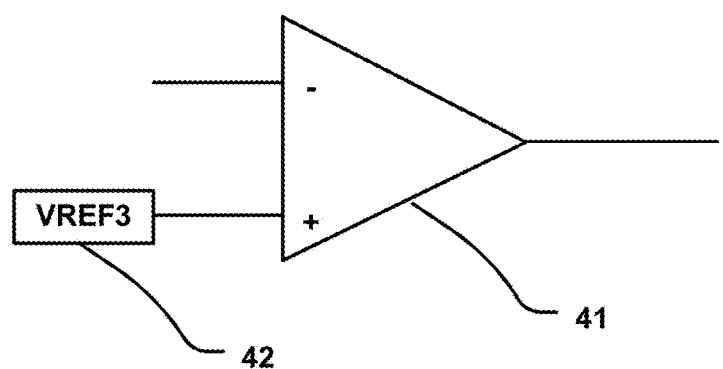
FIG. 11 is a diagram of a comparison circuit provided by the present invention.

FIG. 11 is a diagram of a comparison circuit 4 provided by the present invention. As shown in FIG. 11, the comparison circuit 4 comprises a comparator 41 and a third reference voltage 42.

A first input terminal of the comparator 41 is connected to the output terminal of the amplifier 37, a second input terminal of the comparator is 41 connected to the third reference voltage 42, and an output terminal of the comparator 41 is connected to an output terminal of the comparison circuit 4.

The input terminal of the comparison circuit 4 is the output terminal of the integrator 3, and the output of the comparison circuit 4 is that of the fingerprint sensor.

Figure 12:
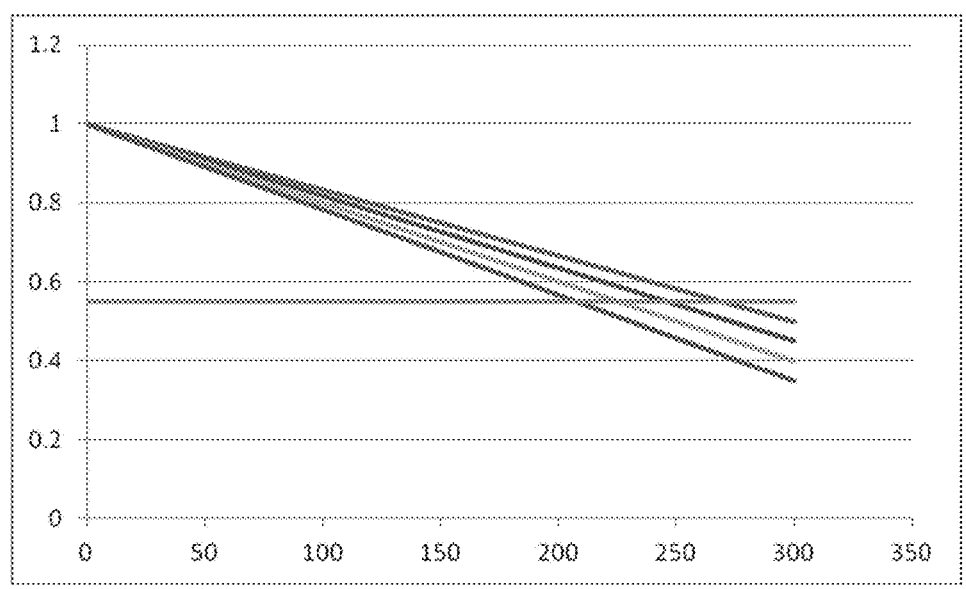
FIG. 12 shows a comparison diagram of an output potential curve of the integrator and a third reference voltage of a comparator.

FIG. 12 shows a comparison diagram of an output potential curve of the integrator 3 and a third reference voltage of the comparison circuit 4. As shown in FIG. 12, if the target capacitors 201 are different, the change rates of the output of the integrator 3 will be different, so intersection points of the output of the integrator 3 and the third reference voltage 42 will be different, and locations of projections on a timeline will be different. The output of the comparison circuit 4 flips at the intersection points of the output of the integrator 3 and the third reference voltage 42.

The present invention is not narrowly limited to the above embodiments. Obviously, the described embodiments are merely part of embodiments of the present invention, but not all embodiments. Based on the embodiments of the present invention, all other embodiments obtained by the ordinary skill in the art without creative efforts should be within a protective scope of the present invention.

What is claimed is:

1. A capacitive fingerprint sensor with an integrator, comprising: a sensing array, a bus, the integrator and a comparison circuit, wherein:
   the sensing array comprises a plurality of sensing units, wherein each sensing unit comprises a target electrode, a sensing electrode, a driving electrode, a first level driver, a second level driver, a line selection switch, an initialization switch and a first reference voltage, and an output terminal of each sensing unit is connected to the bus;
   the bus is connected to output terminals of the plurality of sensing units and an input terminal of the integrator;
   the input terminal of the integrator is connected to the bus, and an output terminal of the integrator is connected to an input terminal of the comparison circuit; and
   the input terminal of the comparison circuit is connected to the output terminal of the integrator, and the output terminal of the comparison circuit is connected to an output terminal of the capacitive fingerprint sensor;
   wherein the integrator comprises:
      a second reference voltage;
      an amplifier;
      a second reset switch, wherein a first port of the second reset switch is directly connected to the second reference voltage, and a second port of the second reset switch is directly connected to a first input terminal of the amplifier;
   wherein charge quantities of discharge of the integrating capacitor for each time are the same so that a change curve of the charge quantities in the integrating capacitor is linear;
   wherein an output voltage of the integrator increases or decreases linearly through time.

2. The capacitive fingerprint sensor with the integrator of claim 1, wherein the sensing electrode comprises one or more sensing electrodes, and is connected to a first port of the initialization switch and a first port of the line selection switch;
   the target electrode is a surface of a target to be measured, is connected to the first level driver and is positioned above the sensing electrode, wherein a dielectric layer is formed between the target electrode and the sensing electrode, and a target capacitor is formed between the target electrode and the sensing electrode;
   the driving electrode comprises one or more driving electrodes, is connected to the second level driver and is positioned below the sensing electrode, wherein another dielectric layer is formed between the driving electrode and the sensing electrode, and a driving capacitor is formed between the driving electrode and the sensing electrode;

a control terminal of the first level driver is connected to a first level control signal, and an output terminal of the first level driver is connected to the target electrode;

a control terminal of the second level driver is connected to a second level control signal, and an output terminal of the second level driver is connected to the driving electrode;

the first port of the line selection switch is connected to the sensing electrode, and a second port of the line selection switch is connected to the output terminal of the sensing unit;

the first port of the initialization switch is connected to the sensing electrode, and a second port of the initialization switch is connected to the first reference voltage; and the first reference voltage is connected to the second port of the initialization switch.

3. The capacitive fingerprint sensor with the integrator of claim 2, wherein the first level driver outputs a level to the target electrode via a resistor when the first level control signal is low, and outputs a level to the target electrode via the resistor when the first level control signal is high.

4. The capacitive fingerprint sensor with the integrator of claim 2, wherein the first level driver outputs a level to a capacitor when the first level control signal is low, and outputs a level to the capacitor when the first level control signal is high, the capacitor outputting an alternating current (AC) component of the levels and in a coupled manner to the target electrode.

5. The capacitive fingerprint sensor with the integrator of claim 2, wherein the first level driver outputs a level to a converting circuit when the first level control signal is low, and outputs a level to the converting circuit when the first level control signal is high, an AC component of the levels and being converted to a reverse AC level through the converting circuit to be coupled to a ground level of the capacitive fingerprint sensor.

6. The capacitive fingerprint sensor with the integrator of claim 2, wherein the second level driver outputs a level to the driving electrode when the second level control signal is low, and outputs a level to the driving electrode when the second level control signal is high.

7. The capacitive fingerprint sensor with the integrator of claim 1, wherein the integrator comprises, an integrating capacitor, a third reset switch, a following switch and a fourth reference voltage, wherein:

the first input terminal of the amplifier is connected to the input terminal of the integrator, a second input terminal of the amplifier is connected to the second reference voltage, and an output terminal of the amplifier is connected to the output terminal of the integrator;

a first port of the integrating capacitor is directly connected to the first input terminal of the amplifier, and a second port of the integrating capacitor is directly connected to a first port of the third reset switch;

the second reference voltage is connected to the second input terminal of the amplifier;

a first port of the third reset switch is directly connected to the second port of the integrating capacitor, and a second port of the third reset switch is directly connected to the fourth reference voltage;

a first port of the following switch is directly connected to the second port of the integrating capacitor, and a second port of the following switch is directly connected to the output terminal of the integrator; and the fourth reference voltage is connected to the second port of the third reset switch.

8. The capacitive fingerprint sensor with the integrator of claim 7, wherein a reset time sequence of the integrator is as follows:

step 1: turning off the following switch;

step 2: turning on the second reset switch, and turning on the third reset switch;

step 3: turning off the second reset switch, and turning off the third reset switch; and step 4: turning on the following switch.

9. The capacitive fingerprint sensor with the integrator of claim 1, wherein the comparison circuit comprises a comparator and a third reference voltage, wherein a first input terminal of the comparator is connected to an input terminal of the comparison circuit, a second input terminal of the comparator is connected to the third reference voltage, and an output terminal of the comparator is connected to an output terminal of the comparison circuit; and the third reference voltage is connected to the second input terminal of the comparator.

10. The capacitive fingerprint sensor with the integrator of claim 1, wherein a control time sequence of the sensing units and the integrator is as follows:

step 1: resetting the integrator;

step 2: turning off the line selection switch;

step 3: turning on the initialization switch;

step 4: setting the first level control signal to be high and setting the second level control signal to be high;

step 5: turning off the initialization switch;

step 6: turning on the line selection switch;

step 7: setting the first level control signal to be low and set the second level control signal to be low; and step 8: returning to step 2.

11. The capacitive fingerprint sensor with the integrator of claim 1, wherein the bus comprises a bus parasitic capacitor, wherein a first port of the bus parasitic capacitor is connected to the input terminal of the integrator, and a second port of the bus parasitic capacitor is grounded or suspended in the air.

12. A capacitive fingerprint sensor with an integrator, comprising: a sensing array, a bus, the integrator and a comparison circuit, wherein:

the sensing array comprises a plurality of sensing units, wherein each sensing unit comprises a target electrode, a sensing electrode, a driving electrode, a first level driver, a second level driver, a line selection switch, an initialization switch and a first reference voltage, and an output terminal of each sensing unit is connected to the bus;

the bus is connected to output terminals of the plurality of sensing units and an input terminal of the integrator;

the input terminal of the integrator is connected to the bus, and an output terminal of the integrator is connected to an input terminal of the comparison circuit; and the input terminal of the comparison circuit is connected to the output terminal of the integrator, and the output terminal of the comparison circuit is connected to an output terminal of the capacitive fingerprint sensor;

wherein the integrator comprises:

a second reference voltage;

an amplifier, wherein a first input terminal of the amplifier is directly connected to the input terminal of the integrator, a second input terminal of the amplifier is directly connected to the second reference voltage, and an output terminal of the amplifier is directly connected to the output terminal of the integrator;

an integrating capacitor, wherein a first port of the integrating capacitor is directly connected to the first input terminal of the amplifier, and a second port of the integrating capacitor is connected to the output terminal of the amplifier; and a second reset switch, wherein a first port of the second reset switch is directly connected to the second reference voltage, and a second port of the second reset switch is directly connected to the first input terminal of the amplifier;

wherein charge quantities of discharge of the integrating capacitor for each time are the same so that a change curve of the charge quantities in the integrating capacitor is linear.

* * * * *